(12) United States Patent
Kinney

(10) Patent No.: US 11,434,946 B2
(45) Date of Patent: Sep. 6, 2022

(54) BOTTLE DECORATION CLIP

(71) Applicant: Angela Yvonne Kinney, Riverside, CA (US)

(72) Inventor: Angela Yvonne Kinney, Riverside, CA (US)

( * ) Notice: Subject to any disclaimer, the term of this patent is extended or adjusted under 35 U.S.C. 154(b) by 0 days.

(21) Appl. No.: 16/785,613

(22) Filed: Feb. 9, 2020

(65) Prior Publication Data

US 2020/0256360 A1 Aug. 13, 2020

Related U.S. Application Data

(60) Provisional application No. 62/803,165, filed on Feb. 8, 2019.

(51) Int. Cl.
*F16B 2/22* (2006.01)
*B65D 23/12* (2006.01)

(52) U.S. Cl.
CPC ............... *F16B 2/22* (2013.01); *B65D 23/12* (2013.01)

(58) Field of Classification Search
CPC ... F16B 2/22; F16B 2/24; F16B 2/005; B65D 23/12; B65D 23/14; Y02W 30/80
See application file for complete search history.

(56) References Cited

U.S. PATENT DOCUMENTS

| | | | | |
|---|---|---|---|---|
| 973,731 A * | 10/1910 | Watkins | ..................... | G09F 3/04 40/310 |
| 1,865,835 A * | 7/1932 | Colby | ....................... | G09F 1/14 40/310 |
| 1,891,099 A * | 12/1932 | Land | ...................... | A47G 21/16 248/229.26 |
| 2,976,629 A * | 3/1961 | Lubis | ........................ | G09F 3/16 40/310 |
| 5,236,725 A * | 8/1993 | McCormack | ........... | G09F 23/00 40/666 |
| D721,579 S * | 1/2015 | Ott | ............................... | D9/436 |
| 10,898,411 B1 * | 1/2021 | Born | ..................... | B65D 23/12 |
| 2002/0083629 A1 * | 7/2002 | Skapyak | .................. | G09F 3/00 40/310 |
| 2003/0226298 A1 * | 12/2003 | Bjork | ........................ | G09F 3/14 40/310 |
| 2004/0079720 A1 * | 4/2004 | Croskrey | ............... | B65D 41/00 215/235 |
| 2005/0126059 A1 * | 6/2005 | Cobb | ........................ | G09F 3/04 40/310 |
| 2005/0127120 A1 * | 6/2005 | Pablo | ........................ | A45F 5/00 224/605 |
| 2007/0193908 A1 * | 8/2007 | Torchia | ............. | A47G 23/0216 206/427 |
| 2008/0048041 A1 * | 2/2008 | Riley | ..................... | G09F 3/0288 235/487 |
| 2008/0222902 A1 * | 9/2008 | Bisceglia | ............... | B65D 23/12 30/541 |

(Continued)

*Primary Examiner* — Robert Sandy
*Assistant Examiner* — Louis A Mercado
(74) *Attorney, Agent, or Firm* — Kirk A. Buhler; Buhler & Associates Patenting

(57) ABSTRACT

A reusable clip for decorating a bottle enables a wide variety of decorations to be attached to the bottle, which may then be provided as a gift. The clip makes it very easy to securely attach and then easily remove the decorations. The clip also has features to enable flexible attachment of decorative components in a way that the decorations may be rearranged or redesigned as necessary.

8 Claims, 4 Drawing Sheets

(56) References Cited

U.S. PATENT DOCUMENTS

| | | | |
|---|---|---|---|
| 2009/0015000 A1* | 1/2009 | Wolfe | G09F 3/16 |
| | | | 206/459.5 |
| 2013/0032567 A1* | 2/2013 | Mueller | 215/386 |
| 2014/0059811 A1* | 3/2014 | Accola | B65D 25/205 |
| | | | 53/461 |
| 2020/0107659 A1* | 4/2020 | Fox | G09F 23/08 |
| 2021/0086946 A1* | 3/2021 | Fox | G09F 23/08 |
| 2021/0121322 A1* | 4/2021 | Prieto | A45D 42/00 |

* cited by examiner

BOTTLE DECORATION CLIP

REFERENCES TO RELATED APPLICATIONS

The present application claims the benefit of provisional patent application Ser. No. 62/803,165, filed Feb. 8, 2019, by the present inventor. The provisional application is incorporated by reference in its entirety.

FIELD OF INVENTION

The present invention relates to bottle toppers, in particular a bottle clip to which decorations may be attached.

BACKGROUND AND RELATED ART

Long-neck bottles are often an integral part of celebrations, whether they be champagne, wine, or other beverages including non-alcoholic ones. Bottles are often decorated to increase the association fanfare. Decorations for bottles usually come in the form of a decorative sleeve or a sparkler attached to the bottle. In some instances, decorations are retained to the bottle using a ring, which may be slid over the top of the bottle and down onto the neck. These devices, and thus the decorations, are not held securely to the bottle, due to the need to size the ring so that it will fit around the variable thickness at the top of the bottle. Other designs, like that shown in United States Design Pat. D72,157,951, appears to sit at the top of a bottle and may be secure only when the bottle is held upright.

UK Patent 2,504,091 relates to a bottle decoration including an elastic ring as a means of attaching the decoration to a bottle. This reference presents the decorations and the means of attaching to the bottle as a single piece, and accordingly, no means of removably fixing decorations are disclosed. Further, this design is intended for loop decorations, like bows, and would not be operable to fix objects such as chenille stems to a bottle.

What is needed is a clip which can securely removably retain decorations, while being easy to install and remove.

SUMMARY OF INVENTION

The present invention concerns a clip which may be slid onto the neck of a wine bottle and securely attached. The clip has decoration retaining structures, which allow decorations to be attached to the clip and prevent those decorations from shifting. The invention may be used in place of traditional bottle decorations, such as ribbons or sleeves, or in place of a wine bottle gift bag.

DETAILED DESCRIPTION

Figure 1:
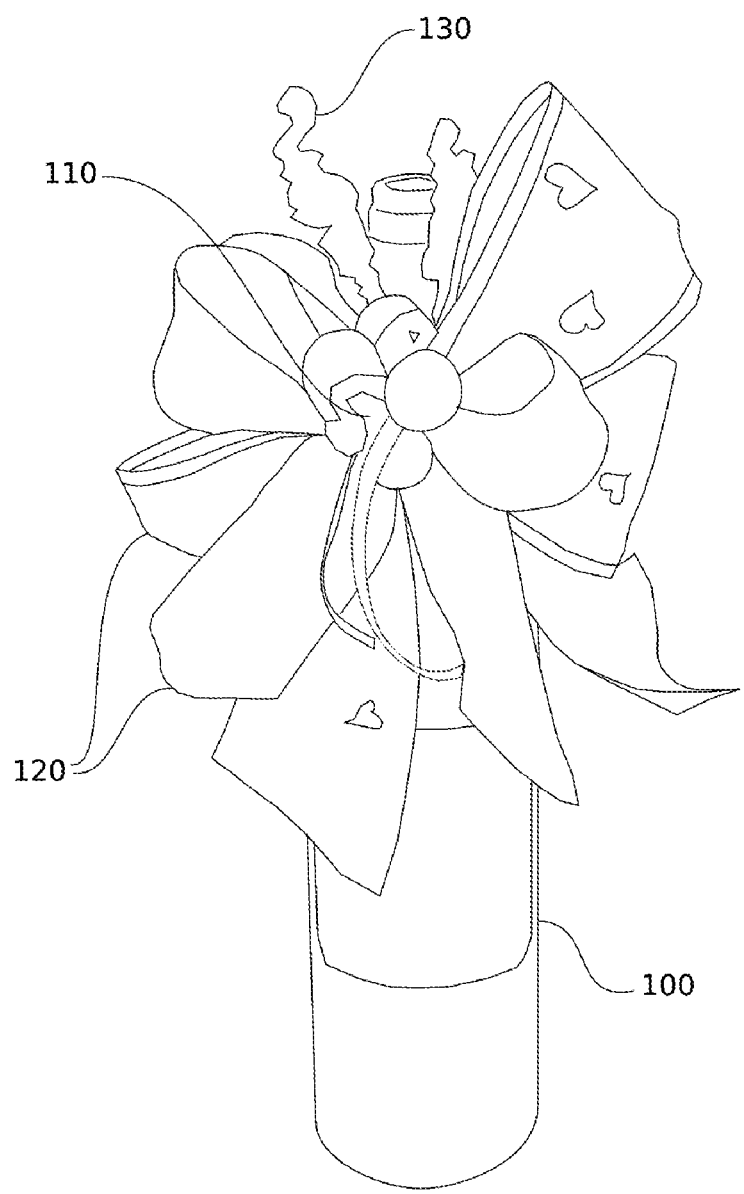
FIG. 1 is a front view of a bottle topper installed on a long-neck bottle

A typical use scenario for the present invention is shown in FIG. 1. Here, a bottle 100 is shown with a decorative bottle topper 110 which comprises bows 120 and other decorations 130. The inventive clip 200, which holds the entire assembly together, is hidden from view. A bottle 100, adorned in this manner can be presented as a gift or put on display for an event and it is easy to imagine countless variations on the styles and designs of ornamentation, from the simple to very ornate.

Figure 2:
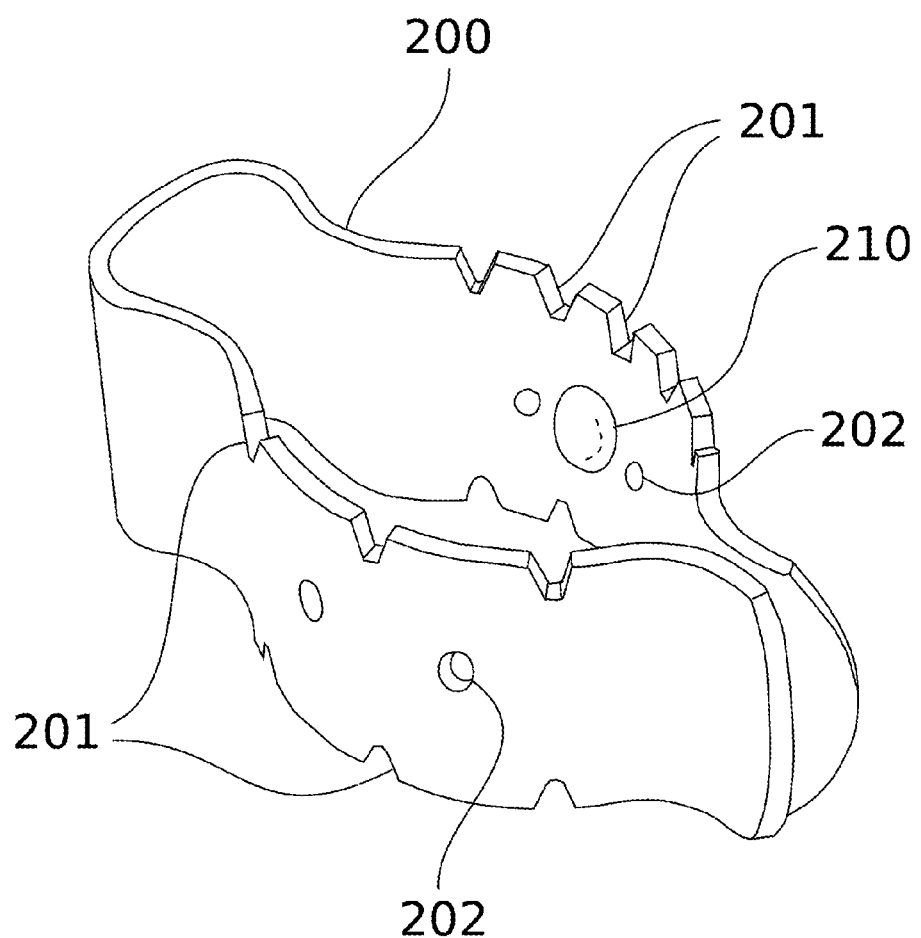
FIG. 2 is a perspective view of the inventive clip unadorned

The clip 200 may comprise a ring shaped member, or in a preferred embodiment as shown in FIG. 2, a substantially c-shaped member. In a preferred embodiment, the clip 200 has an opening, a primary diameter, and a flat side. The clip opening may be sized to have a width slightly smaller than the diameter of a bottle neck. The primary diameter may be slightly undersized with respect to a bottle neck 101, such that the flat side acts as a flat spring. The clip 200 may have notches 201, holes 202 and/or other structural features useful for securing decorations 130 to the clip. It should be understood that the invention may be adapted to accommodate many shapes and sizes of bottles other than a standard 750 milliliter wine bottles, including a variety of beverage and condiment bottles.

In a preferred embodiment, the clip 200 is slid onto the neck 101 of the bottle 100 from the side. In such an embodiment, the design of the clip (as shown), as well as the materials, permit the clip to deform slightly to be slid around the neck of the bottle. Preferably, the clip 200 remains in a flexed configuration while it is on the bottle neck 101. Accordingly, the lateral portions of the clip 200 exert force on the neck of the bottle 101. This force and the corresponding friction prevent the clip 200 from shifting or falling off. The clip may further employ a layer or pad 210 made of a rubberized or otherwise soft or grippy material to improve the interface to the bottle 100. The clip 200 can later be released by applying pressure to open the grip. In some embodiments, the clip 200 may be designed to attach below the neck, to the main body of a bottle 100. In those embodiments, the requirements of the clip are the same, although alternative clip designs may be more suitable to that application.

In a preferred embodiment, the clip 200 may be shaped similarly to a terry clip, wherein the clip is primarily c-shaped, with a flat portion opposite the clip opening acting as a spring. Terry clips are also referred to as spring clips or open tool clips. However, the mechanical arts are replete with clip designs, and many such designs may form the basis for a clip in accordance with present application. Such designs include a hose clamp, a circlip, also known as a snap ring, and spring collar, commonly seen on barbells and other weightlifting equipment. A suitable clip will exert force about the neck of the bottle, allowing the secure fixation of decorations. It should be understood that the invention may be practiced using modified versions of these, and other designs. A design similar to a terry clip, however, is preferred for its easy use, as it may be slid onto the neck of a bottle from the side, and removed similarly. No matter the specifics of the particular design, a goal of the inventive clip is to be relatively compact while supporting the desired level of adornment.

Figure 3:
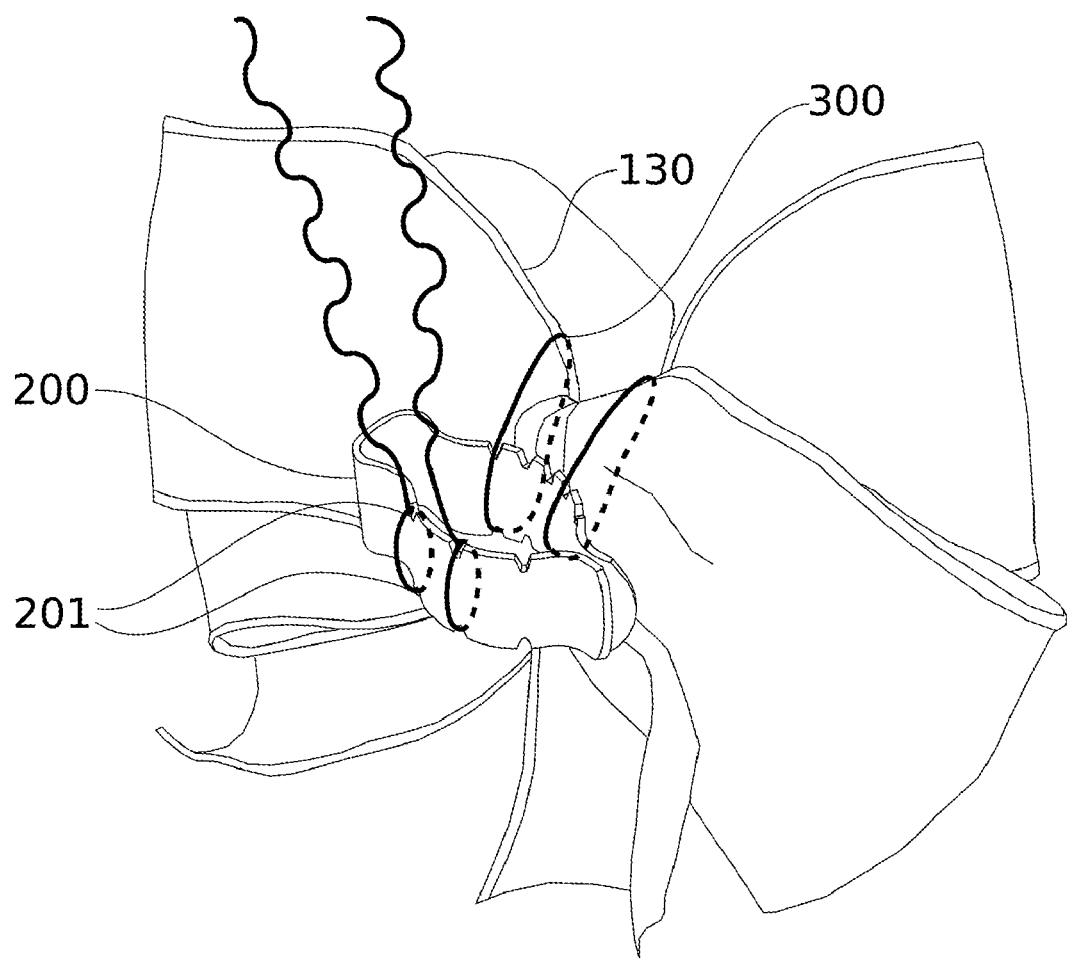
FIG. 3 is a perspective view of the inventive clip with decorations attached in partial assembly

FIG. 3 shows a partially assembled bottle topper consistent with the present invention. The inventive clip 200 is shown, attached to decorations by a fastener 300 (which, itself, may be a decoration) routed through the notches 201. Generally, it is preferable that the clip 200 has at least one decoration retaining mechanism (such as a notch 201, depression or hole 202) to prevent decorations 130 from shifting vertically, including falling out of the clip, and to prevent decorations from shifting within the clip. In particular, the retaining mechanism should ensure decorations 130 do not shift within the clip 200 around the diameter of the bottle 100, as well as on their own axis. It is envisaged that decorations 130 attached to the clip 200 will be arranged in a particular matter. Thus, decorations should be held securely to prevent unwanted motion that can detract from the aesthetic effect. Other possible retaining mechanisms include straps, bands, hollow cylinder-shaped structures and indentations on the surface of the clip. In some embodiments, the clip may employ hollow internal sections or holes 202 (as shown in FIG. 2), oriented vertically or horizontally, to enable decorations or fasteners for decorations to pass through the clip.

Preferably, the retaining means are notches 201 in the body of the clip 200. Notches 201 may be placed on both the upper and lower portion of the clip 200. The number of notches in the clip can influence the number of decorations 130 that may be affixed to the clip. As such, the number of notches may vary. The clip may have 2 to 30 notches 201, corresponding to 1 to 8 (or more) decorations 130. Preferably, the clip should have 16 notches oriented such that 3 decorations may be fixed on one side of the clip and 5 decorations on the opposite side. A decoration 130, such as a chenille stem, may be securely attached to the clip by passing the stem through the interior of the clip, bending the lower distal end up within in a bottom notch, and securing the lower distal end to the upper distal end by wrapping the lower distal end around the upper distal end, for example. In general, such decorations 130 may be attached to the clip within notches to prevent the decoration from sliding around the clip. A bow 120, stuffed animal, or other object may be attached to the clip by wrapping a stem around the object (using the stem as a fastener 300), and twisting the ends of a stem together. It should be noted that many decorations 130 such as chenille stems and ribbon may function both as decorations as means of securing other objects, such as a bow 120, by passing those decorations through a notch and wrapping them around the object.

The decorations retained to the clip are primarily the choice of the user or designer. Decorations held by the clip may be chenille stems 130, also known as tinsel stems or pipe cleaners. Other decorations 140 may include: flowers, streamers, sparklers, ribbon, including wire ribbon, and so on. In turn, the retaining means may be selected based on the decorations intended to be used, such as tubes may best suit flowers, while notches may best suit chenille stems. Further decorations may be attached to the bottle around the clip 200. For example, ribbons may be tied around the bottle after the clip is affixed. However, this may negate some benefits of the invention, as it would prevent the clip from being easily slid onto or removed from the bottle. An objective of the invention is that decorations may be added to or removed from the bottle 100 as a singular piece.

Figure 4:
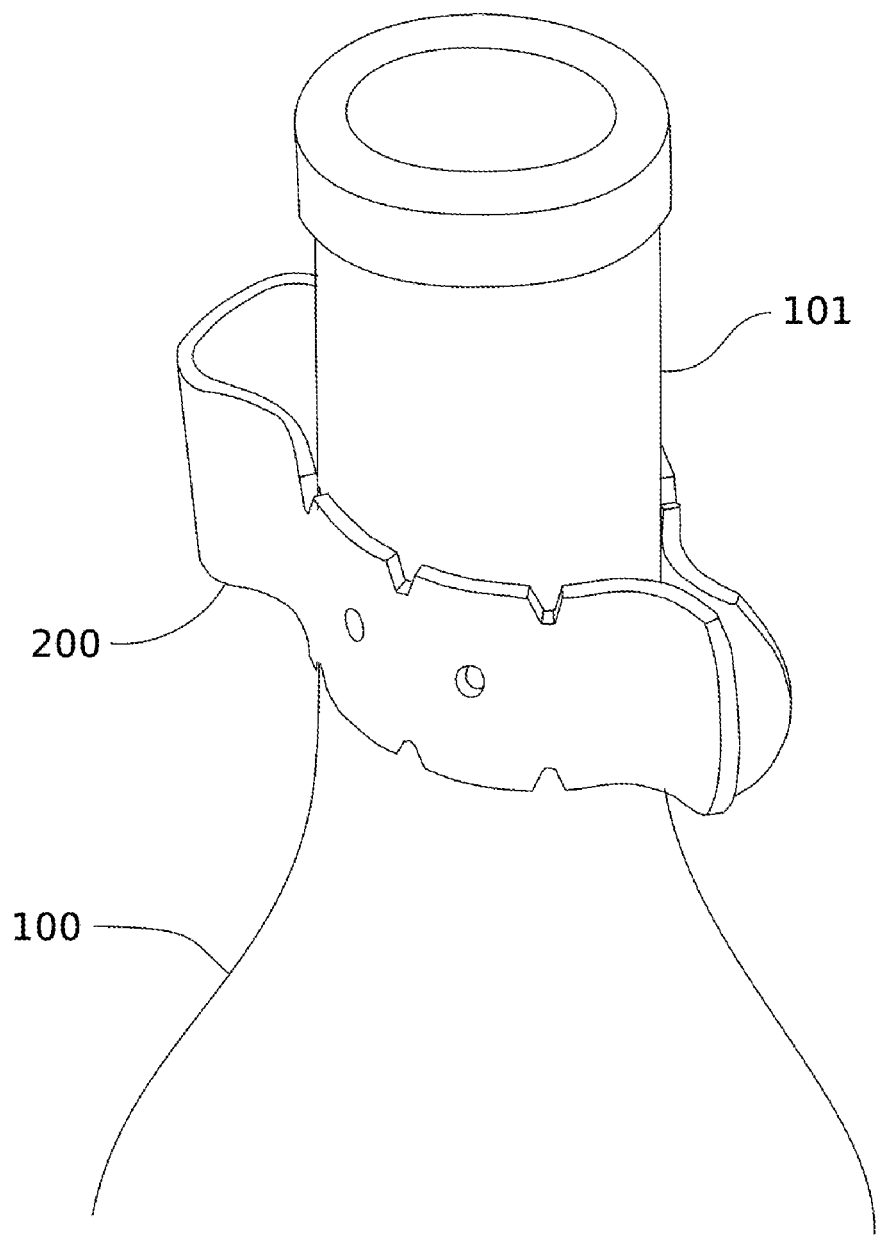
FIG. 4 is a perspective view showing the clip mounted on the neck of a bottle.

FIG. 4 shows an embodiment of the inventive clip 200, affixed to the neck 101 of a bottle 100. Preferably, the clip 200 should be constructed from a material which may deform and return to its original shape, such as plastic or metal. In particular, the properties of the material should provide for the clip to exert a restorative force when the clip 200 is stretched, such as when the opening of the clip is widened. This facilitates the clip being attached to a bottle 100 by sliding the clip onto the neck of the bottle 101 laterally. Among the potential materials, plastic stands out for its ease of manufacturing (injection molding, for example) and low cost. The clip 200 may instead be constructed from combinations of materials. For example, the clip may have a metal core, providing the desired elasticity, and a rubber coating or pad 210 to provide better interfacing and/or friction with a glass bottle surface.

While certain preferred embodiments have been illustrated and described for purposes of the present disclosure, numerous substitutions in components may be made by those skilled in the art. It is to be understood that the present invention may be practiced otherwise than as specifically described herein without departing from the scope and spirit thereof

I claim:

1. A bottle decoration clip comprising:
    a clip body, said clip body being operable to grip a bottle;
    a plurality of decoration retaining structures formed directly into said clip body wherein said plurality of decoration retaining structures comprises at least two notches, and
    said clip body has composite construction of metal layered with at least one grippy material.

2. The bottle decoration clip of claim 1, wherein said clip body is operable to slide onto a neck of said bottle.

3. The bottle decoration clip of claim 1, wherein said decoration retaining structure comprises at least one notch in said clip body.

4. The bottle decoration clip of claim 1, wherein said decoration retaining structure comprises at least one hollow structure formed through said clip body.

5. The bottle decoration clip of claim 1, wherein said clip body is plastic.

6. The bottle decoration clip of claim 1, wherein said clip body is metal.

7. The bottle decoration clip of claim 1, further comprising at least one decoration.

8. The bottle decoration clip of claim 1, wherein said clip body is a terry clip.

* * * * *